Feb. 23, 1965   L. O. KELLEY   3,170,301
PIPE AND/OR CABLE LAYING DEVICE
Filed Dec. 3, 1962   3 Sheets-Sheet 1

Leon O. Kelley
INVENTOR.

BY
Wayland D. Keith
His Agent

Leon O. Kelley
INVENTOR.

BY
His Agent

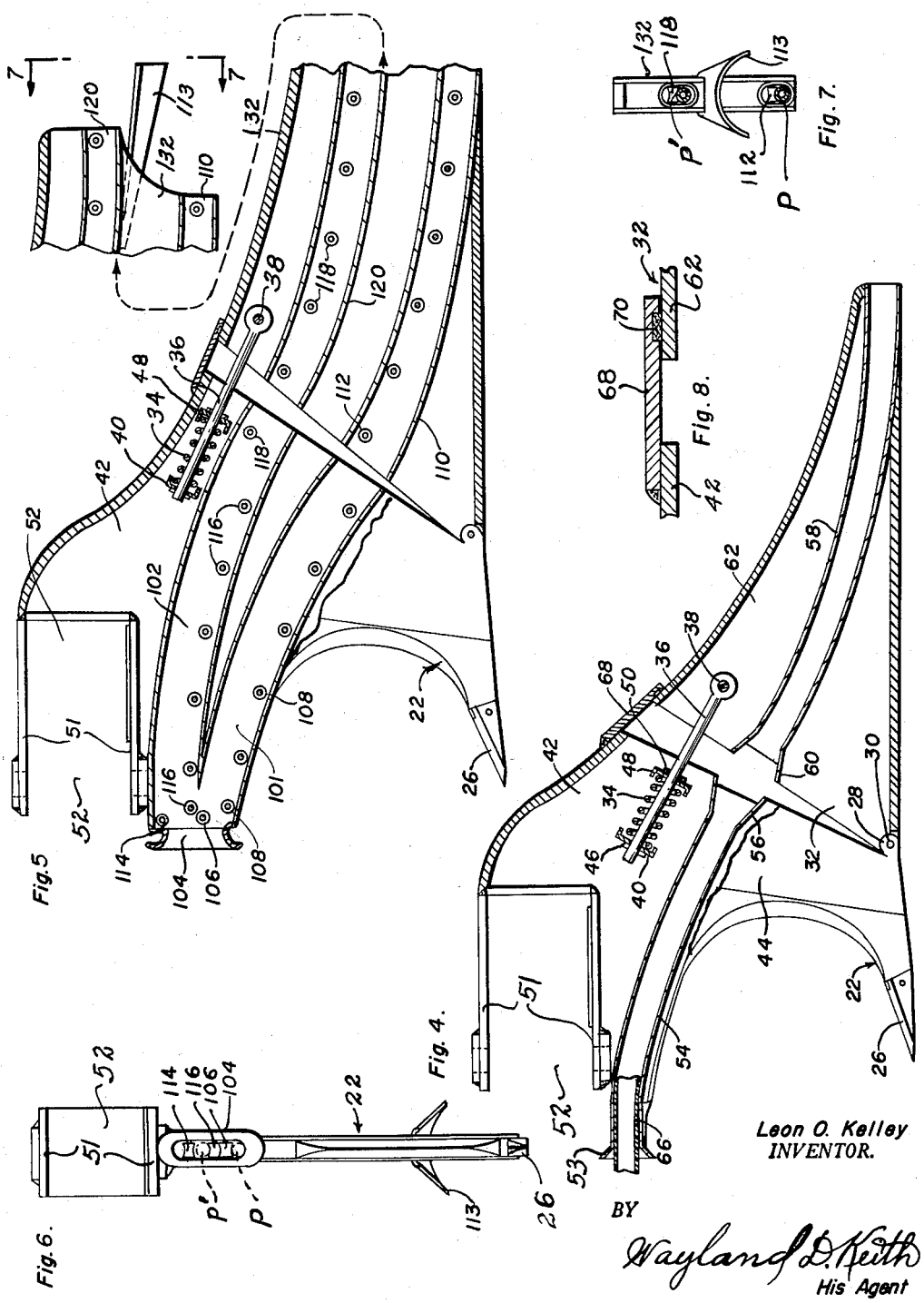

3,170,301
PIPE AND/OR CABLE LAYING DEVICE
Leon O. Kelley, P.O. Box 488, Stamford, Tex.
Filed Dec. 3, 1962, Ser. No. 241,703
10 Claims. (Cl. 61—72.6)

This invention relates to a tractor mounted combination pipe and cable laying device, and more particularly to a combination pipe and cable laying device for laying rigid pipe and armoured cable, either singly or in pairs simultaneously, with the same plow.

Various plows have been proposed heretofore for laying cables as well as for laying pipe joined in an elongated conduit, but these, for the most part, were auxiliary to the traction element, in as much, as they were trailed behind the traction element on a separate and independently mounted wheeled structure. Such a plow lacked the flexibility of control of a unit built on the traction element.

A plow unit built on the traction element can be moved into close places to simultaneously excavate a ditch and lay the pipe or armoured cable therein. If two pipes or two armoured cables are to be laid or one of each, one above the other, the lowermost cable or the lowermost pipe, as the case may be, is covered to a desired depth to support the uppermost cable or pipe within the ditch a spaced distance above the lowermost cable or pipe.

The present device is so constructed that a pipe or cable may be laid in accordance with a predetermined survey. The operator of the tractor may lay several hundred feet of pipe and/or cable a day to the desired depth on the predetermined survey. The present device attaches to a traction element, preferably of the crawler type, which are known under various trade names, such as Caterpillar and the like.

The pipe and/or armoured cable can be buried in the ground to a depth of at least four feet, into an excavation that is only slightly wider than the diameter of the pipe and/or cable being laid. Therefore, much time and expense is saved by not having to back fill the ditch, which would formerly have had to be excavated to a width in which a man could work.

An object of this invention is to provide a tractor mounted attachment for simultaneously laying rigid type pipe or heavy armoured cable within a furrow being plowed.

Another object of the invention is to provide an attachment for a tractor, whereby rigid pipe or armoured cable may be laid simultaneously with the forming of the ditch, either singly or in any combination.

Still another object of the invention is to provide a traction element which will direct rigid pipe or armoured cable into the ditch being plowed without distortion or kinking thereof.

A further object of the invention is to provide a pipe and cable laying attachment, the drawbar of which attachment is below the center of gravity thereof, so as to maintain the traction element stable while pulling the plow through the stratum of the earth.

Still a further object of the invention is to provide a pipe or cable laying attachment for a traction element which is hydraulically controlled, so that the operator of the traction element may control the operation of the pipe and/or cable laying attachment simultaneously with the operation of the traction element.

Yet a further object of the invention is to provide a device for laying rigid pipe and/or heavy armoured cable, which device is readily attachable to and detachable from a traction element, thereby enabling the traction element to be free for other work when not laying pipe or cable.

With these objects in mind, and others which will become manifest as the description proceeds, reference is to be had to the accompanying drawings, in which like reference characters designate like parts in the several views thereof, in which:

FIG. 4 is a longitudinal sectional view through the form of the pipe and cable laying device as shown in FIGS. 1 and 2;

FIG. 5 is a longitudinal sectional view through a modified form of the device which is for laying a pair of armoured conduits or pipe in the same furrow, but one spaced above the other with earth being filled in between the pipes or cables;

FIG. 6 is a front elevational view of the form of the invention as shown in FIG. 5;

FIG. 7 is a fragmentary, rear elevational view of the form of the invention shown in FIG. 5, showing the earth covering device for the lower pipe or cable;

FIG. 8 is an enlarged fragmentary view of a sealing strip between the front and rear portions of the pipe or cable laying plow; taken on the line 8—8 of FIG. 2.

Figures 1, 9:
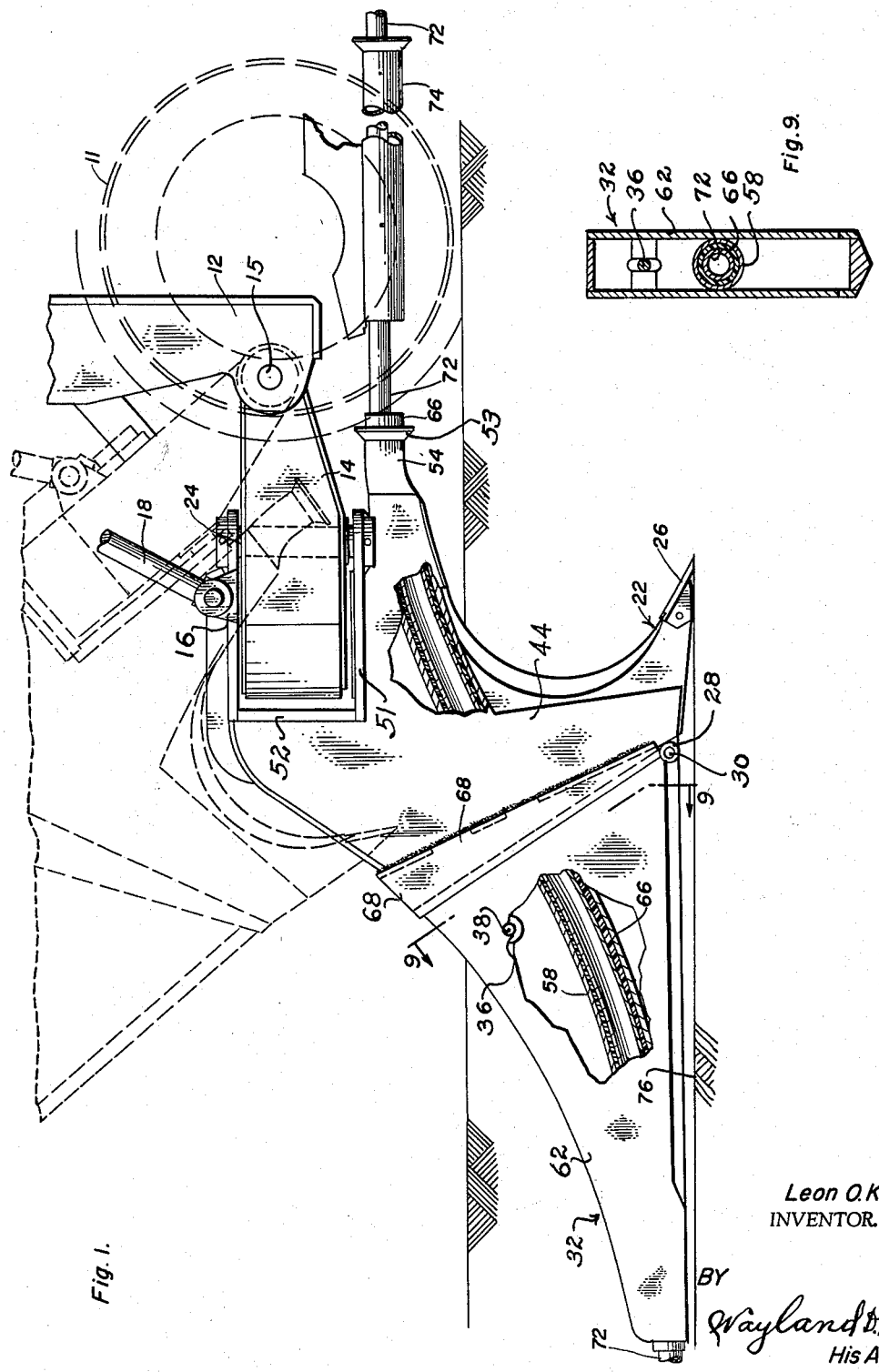
FIG. 1 is a side elevational view of the pipe and/or cable laying device shown to be attached to a traction element with the traction element being shown in dashed outline, with parts of the pipe laying device shown to be broken away and with parts shown in section, and showing the plow of the device in raised position in dashed outline.
FIG. 9 is a sectional view taken on the line 9—9 of FIG. 1, looking in the direction indicated by the arrows.

With more detailed reference to the drawing, the numeral 11 designates generally the traction element, such as a track laying tractor, having the drawbar 12 secured thereto in a manner as shown in the patent to Carlton O. Kelley, dated March 5, 1957, Patent No. 2,783,699, for Ripper Plows. To the drawbar 12 is attached a pivoted frame 14 by pivot pins 15, the upper side of which frame has apertured lugs 16 secured thereto, to which the rams 18 of hydraulic cylinders 20 are pivotally connected, which hydraulic system is more fully explained in the above mentioned patent.

A plow, designated generally at 22, is pivotally connected to pivoted frame 14, medially thereof, by a pivot pin 24, which will enable the plow 22 to be maintained in upright position and to swing about pivot pin 24, which pivot pin 24 lies in a medial, longitudinal, vertical plane which passes through the traction element 11. The plow 22 has a plow point 26 on the lower, forward side thereof which opens a furrow or rips a trench to the desired depth, and into which trench or furrow a pipe or cable is laid. To the rear portion of plow frame 44, near the bottom thereof, lugs 28 are secured, which lugs are apertured to receive a rearwardly extending frame portion 32, which forms a pivot pin 30 therethrough. A drag portion of the plow 22 is pivotally connected to lugs 28 by pin 30, which portion 32 is urged downward by a spring 34, which is slid over an eye bolt member 36, which eye bolt member is pivotally connected to the pivot pin 38 which passes through the rearwardly extending frame portion 32. The opposite end of the eye bolt member 36 extends through an apertured member 40 which is welded intermediate the sides 42 of the forward frame portion 44 of the plow 22. A limit pin 46 passes through the eye bolt member 36 near the distal end thereof from pivot pin 38, so as to limit the downward movement of rearwardly extending frame portion 32 of the plow 22. An apertured abutment 48 is positioned on eye bolt member 36 so as to compress spring 34. A pin 50 passes through eye bolt member 36 to hold the abutment 48 into close contact relation with the spring 34. The forward end of the frame portion 44 of the plow 22 has lugs 51 secured thereto to form a throat 52 to receive frame 14 therebetween.

Figure 2:
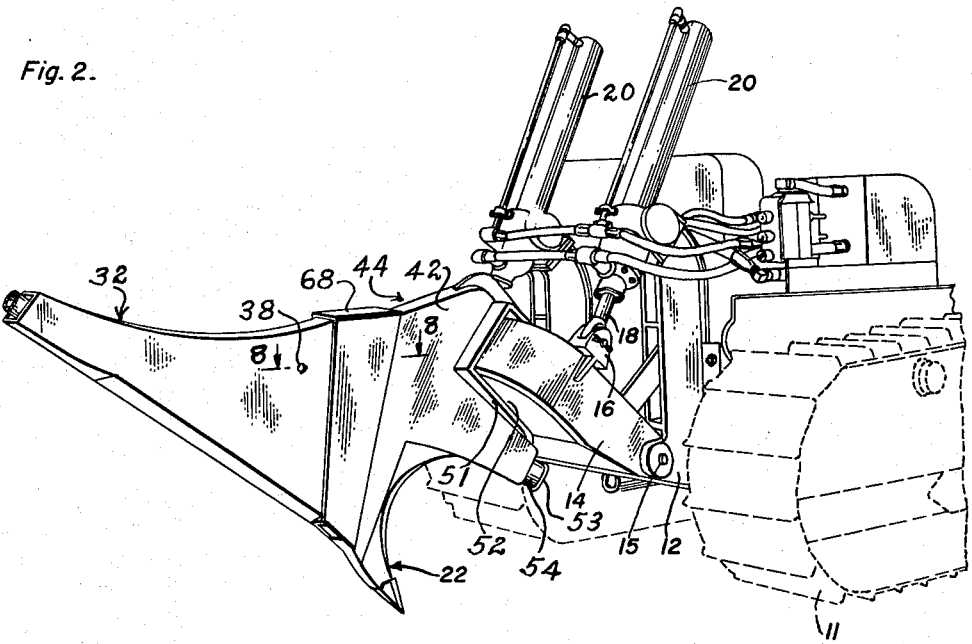
FIG. 2 is a perspective view taken from a side and the rear of the pipe and/or cable laying device, showing the plow of the device in raised position.
Figure 3:
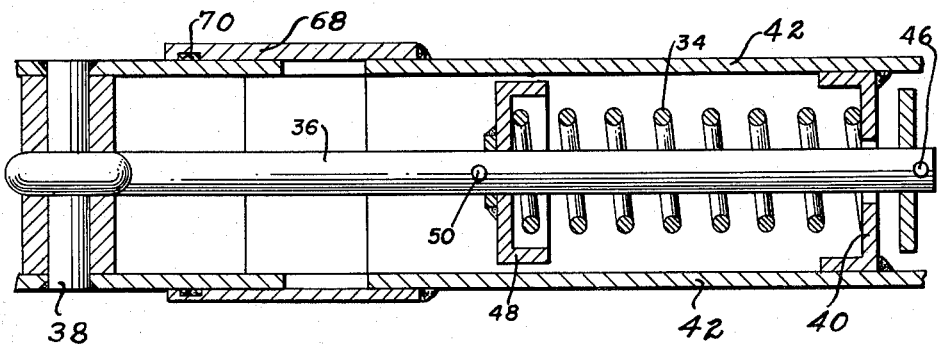
FIG. 3 is an enlarged fragmentary elevational view with parts being shown in section of a spring hold-down device.

The sides 42 of the forward frame portion 44 of plow 22 are spaced apart to receive, as in FIGS. 1, 2, and 4, a conduit 54 therebetween, as well as the spring 34 and apertured abutments 40 and 48. The conduit 54 is belled as indicated at 56 and has a downwardly curving contour towards the rear end thereof. A conduit 58 having a belled portion 60 is positioned between walls 62 of the rear frame portion 32 of plow 22. The belled portion 60 of conduit 58 is positioned in aligned relation with belled portion 56 of conduit 54, with the conduit 58 extending rearwardly from the belled portion 60 and being curved downwardly and rearwardly to the rear end of rearwardly extending frame portion 32 of plow 22. The conduit 54 has a belled portion 53 on the forward end.

It has been found that a plastic tube 66 may be fitted within conduits 54 and 58 to form a lining therefor, as well as a bearing media for the pipe or cable passing therethrough, since certain plastics of the thermo setting group form a bearing surface which presents less friction than metal to metal. This plastic tube 66 is secured to the forward end of conduit 54 so when this has served its useful life, the plastic tube 66 may be easily removed and another plastic tube fitted therein with the plastic tube 66 extending completely through conduits 54 and 58.

The forward frame portion 44 of the plow 22 has a shield 68 secured thereto, as by welding or the like, which shield 68 extends rearwardly and covers the opening formed between the adjacent ends of the forward portion 44 and the rearward portion 32 to prevent earth from entering from between the pivoted portions 44 and 32. The shield 68 preferably has a felt seal 70 along the sides and across the top, as will best be seen in FIG. 8. The limit pin 46 will prevent the rear frame portion 32 of plow 22 from dropping down sufficiently to permit an opening being formed between the frame portions 32 and 44 of plow 22. FIG. 1 shows a pipe 72, which may be rigid, plastic, or armoured cable being passed from the forward end of the traction element 11 through a guide tube 74 into the plastic tube liner 66 within conduit 54.

The conduits 54 and 58 are so curved that the pipe 72 being introduced thereinto will be directed from above the ground to the bottom of the ditch 76 being plowed by plow 22.

*Operation of the first form of invention*

With the plow 22 connected to drawbar 12 of traction element 11 so as to pivot the frame 14 about pivot pins 15, the frame 14 and plow 22 are lowered by hydraulic cylinders urging hydraulic rams 18 downward to the desired depth at which the plow 22 is to operate. With the plow 22 maintained at this depth, a pipe, either rigid or plastic, or an armoured cable is fed into guide tubes 74 forward of traction element 11 and into plastic tube 66 positioned within conduits 54 and 58 within the forward frame portion 44 and the rear frame portion 32 of plow 22. The pipe or cable 72 is urged downward and through plastic tube 66 until it extends outward at the rear end of the rear frame portions 32 of plow 22. The curve of conduits 54 and 58 is such that when the pipe 72 is drawn therethrough, the pipe 72 will come out at the rear end portion of plastic tube 66 into ditch 76 in a substantially straight position.

As the traction element 11 moves forward, the pipe 72 is directed to the bottom of the ditch 76 and, if desired, a covering drag (not shown) may be dragged behind the plow 22. This enables the pipe to be simultaneously laid and covered without the use of other or accessory equipment. However, since covering devices are well known in the art, no showing thereof is made in this form of the invention.

It is to be pointed out that by having the rear frame portion 32 pivoted to the forward frame portion 44 by pivot pin 30 and with the rear frame portion 32 being urged to the bottom of the ditch 76 by spring 34, the pipe 72 is laid in the bottom of the ditch regardless of the depth at which the point 26 of plow 22 is maintained. However, upon lifting upward on plow 22 with hydraulic cylinders 20, the pin 46 will engage abutment 40 and will prevent the pivoting of the rear frame portion 32 of plow 22 beyond a predetermined point.

By having the belled portions 56 and 60 in end to end alignment, the plastic tube 66 will readily slide within the respective conduits 54 and 58 without wrinkling or kinking the plastic tube 66 or the pipe therein. By having the plow 22 pivoted for pivotal movement about pin 24 which passes through frame 14 and through the lugs 51 on the forward end of plow 22, a pipe can be laid in a curved ditch by steering the traction element in a curved path, without the pipe becoming kinked or without the plow 22 being pulled sidewise while embedded within the terrain.

*Second form of invention*

A second form of invention (detached from the traction element) is shown in FIGS. 5, 6, and 7, wherein a plurality of pipes or cables, such as armoured cables, may be laid simultaneously in the same ditch but with one pipe or cable being spaced above the other. This form of the invention embodies a plow 22 which is substantially of the same character as the aforementioned form of invention, however, a plurality of conduits, two in the present instance, 101 and 102 extend rearwardly from the front end of the forward frame portion 44 of the plow 22 toward the rear thereof. However, the conduits 101 and 102 have belled portion 104 at the forward end of the conduits, so as to guide pipe or cable P and P' into the respective conduits 101 and 102. The forward end of conduit 101 has rollers 106 and 108 therein to direct the pipe or cable P between the rollers and into the conduit 101 onto further rollers 108 within the conduit 101, with rollers being positioned on the lower side thereof to direct the pipe downward and thence into conduit 110, whereupon rollers 112, within conduit 110, will engage the top portion of the pipe or cable being passed therethrough and the pipe P will be directed outward therefrom into the bottom of the ditch formed by plow 22 at the rear end of conduit 110.

The conduit 102 has rollers 114 and 116 in the forward end thereof to direct pipe P' from belled portion 104 into conduit 102, whereupon, the conduit directs the pipe or cable downward over rollers 116 in conduit 102 beneath rollers 118 in conduit 102 into conduit 120 in the rear frame portion 132 of the plow 22 and thence outward at the rear end of condut 120. However, a covering plow 113 is mounted on rearwardly extending frame portion 132 and is positioned directly below conduit 120 and is so-ached and shaped as to drag dirt into the ditch being plowed from the sides thereof to cover the pipe P which passes outward from the rear end of conduit 110. The dirt which forms the covering for pipe P will also form the resting place for the pipe P' which passes outward from the rear end of conduit 120. The rollers 106 and 108, 112, 114, 116, and 118 are contoured to fit the portion of the pipe or cable being laid, as will best be seen in FIG. 6, to prevent the crushing or kinking of pipe or cable.

This form of the invention also has a spring 34 which is slid over bolt member 36 in the manner described in the aforementioned form of the invention. All parts common to both forms of invention have been numbered with like reference characters and for a more detailed description of these, reference is to be had to the first form of the invention.

Operation of second form of invention

In the form of invention as shown in FIGS. 5, 6, and 7 the pipe or cable is directed into a guide pipe forward of the traction element 11 and is directed thereunder into belled portion 104 thence downward through the respective conduits 101 and 102 between the rollers in the respective condits 101-110 and 102-120 so that the pipe or cable being laid will pass out through the rear ends of conduit 110 and 120 respectively, with the plow 113 initially covering the pipe passing out through the rear end of conduit 110. With the plow 113 covering the pipe in this manner, the conduit or cable passing out through the rear end of conduit 120 will come to rest on the earth which is drawn in from the sides of the ditch by plow 113. Furthermore, a further drag or covering element (not shown) may be pulled behind the plow 22 to complete the covering operation of the entire ditch by a single machine and a single operator.

This form of the invention also has the trenching or ripping plow point 26, which is lowered to the desired depth by a hydraulic cylinder system 20, such as shown in FIGS. 1 and 2.

While the invention has been illustrated and described in two forms thereof, it is to be understood that variations and changes may be made in the minor details of construction to meet specific needs and requirements and to adapt to different applications, without departing from the spirit and intent of the invention or the scope of the appended claims.

Having thus clearly shown and described the invention, what is claimed as new and desired to be secured by Letters Patent is:

1. A device for laying pipe and the like for use with a traction element having a draw bar thereon, which device comprises;
   (a) a first frame connected with the draw bar of the traction element for pivotal movement of said frame about a horizontal axis,
   (b) a second frame portion,
      (1) said second frame portion having an aperture formed horizontally therethrough at the rear end thereof near the bottom, and an upright hole formed at the forward end thereof,
   (c) a pivot pin pivotally connecting said second frame portion to said first frame for pivotal movement of said second frame portion about an upright axis,
   (d) a pointed plow mounted on the lower, forward portion of said second frame portion,
   (e) a third frame portion extending rearwardly from said second frame portion,
      (1) said rearwardly extending frame portion being horizontally apertured on the forward end thereof near the bottom, which aperture is adapted to register with said horizontal aperture in said second frame portion,
   (f) a pivot pin extending horizontally through said registering apertures in said second and third frame portions to connect said frame portions together in end to end pivotal relation,
   (g) said second frame portion having a horizontal opening extending into the forward end thereof a spaced distance above said pointed plow and above the normal ground level when said plow is in plowing position within the terrain,
      (1) said opening extending downwardly and longitudinally through said second frame portion, which opening terminates on the rear face thereof,
   (h) said third frame portion having an opening extending longitudinally therethrough with the forward end of the opening being in register with the opening which terminates on the rear end of said second frame, when said third frame portion is in one position,
      (1) said opening in said third frame portion terminating at the rear end of said third frame portion substantially at the bottom thereof so pipe and the like may be directed into the opening on the forward end of said second frame portion at a point above the ground and will be directed out of the opening in the rear end of said third frame portion substantially at the bottom thereof to enable a pipe or the like to be directed and laid below the surface of the terrain as the traction element draws the plow through the terrain.

2. A device for laying pipe and the like for use with a traction element having a draw bar thereon, as defined in claim 1; wherein
   (a) pivot means pivotally connected to one of said last mentioned frame portions and extending into the other of said last mentioned frame portions,
   (b) a spring surrounding said pivot means,
   (c) an abutment on said pivot means,
   (d) an abutment secured to the frame portion into which said pivot means extends to restrain said spring between said abutment on said pivot means and said abutment on said frame portion,
   (e) retaining means secured to the distal end of said pivot means to limit the downward movement of the rear end of said third frame portion under the influence of said spring.

3. A device for laying pipe and the like for use with a traction element having a draw bar thereon, as defined in claim 2; wherein
   (a) said second and third frame portions having a wedge-shaped space formed therebetween with the apex thereof being substantially common to the horizontal pivot pin connecting said second and third frame portions,
   (b) a plate closure member secured to one of said frame portions and extending across said wedge-shaped opening in overlapping relation in such manner as to enable said second and third frame portions to move about said horizontal pivot pin within the limits of said wedge-shaped opening, and
   (c) sealing means interposed between said overlapping portions of said plate and said frame portion, and movably associated with one of said overlapping portions to prevent the entrance of dirt into said wedge-shaped opening.

4. A device for laying pipe and the like for use with a traction element having a draw bar thereon, as defined claim 1; wherein
   (a) a plastic tube extends through said longitudinal openings in said second frame portion and in said third frame portion to form a friction reducing guide for the pipe or the like passing therethrough.

5. A device for laying pipe and the like for use with a traction element having a draw bar thereon, as defined in claim 4; wherein
   (a) said longitudinal openings formed in said second and third frame portions have the adjacent ends thereof enlarged to form bell-shaped cavities,
   (b) said plastic tube passing through said hollow, bell-like portions to guide the pipe therethrough,
   (c) said belled portions enabling said plastic tube to abridge between said second and third frame portions in aligned relation during the pivotal action of said horizontal pivot of said second and third frame portions.

6. A device for laying pipe and the like for use with a traction element having a draw bar thereon, which device comprises;
   (a) a first frame connected with the draw bar of the traction element for pivotal movement of said frame about a horizontal exis,
   (b) a second frame portion,
      (1) said second frame portion having an aperture formed horizontally therethrough at the rear end thereof near the bottom, and an upright hole formed at the forward end thereof, (c) a pivot pin pivotally connecting said second frame portion to said first frame for pivotal movement of said second frame portion about an upright axis, (d) a pointed plow mounted on the lower forward portion of said second frame portion, (e) a third frame portion extending rearwardly from said second frame portion, (1) said rearwardly extending frame portion being horizontally apertured on the forward end thereof near the bottom, which aperture is adapted to register with said horizontal aperture in said second frame portion, (f) a pivot pin extending horizontally through said registering apertures in said second and third frame portions to connect said frame portions together in end to end pivotal relation, (g) said second frame portion having a substantially horizontal opening extending into the forward end thereof a spaced distance above the pointed plow and above the normal ground level when said plow is in plowing position within the terrain, (1) said opening branching into two openings within said second frame portion, one opening being spaced above the other, which openings extend downwardly and longitudinally through said second frame portion and terminate of the rear face thereof, (h) said third frame portion having two openings extending longitudinally therethrough with the forward ends of the openings being in register with the respective openings which terminate on the rear end of said second frame portion when said third frame is in one position, (1) one of said openings in said third frame portion terminating at the rear of said third frame portion substantially at the bottom thereof, so pipe and the like may be directed into the opening at the forward end of said second frame portion at a point above the ground and will be directed out through the opening in said third frame portion substantially at the bottom thereof to enable pipe or the like to be directed and laid below the surface of the terrain as the traction element draws the plow through the ground, (2) the other of said openings in said third frame portion extending longitudinally therethrough and terminating at the rear end thereof a spaced distance above said first mentioned longitudinal opening so as to enable a second pipe or the like to be directed through said opening into a furrow opened by said plow simultaneously as said first mentioned pipe or the like is being laid below the surface of the terrain as the traction element draws the plow therethrough.

7. A device for laying pipe and the like for use with a traction element having a draw bar thereon, which device comprises the structure as defined in claim 6; and wherein (a) said openings extending longitudinally through said second and third frame portions having spaced apart rollers journaled therein on the convex side of each said opening so as to guide said pipe or the like in a curved path through the respective openings as the device moves over the terrain.

8. A device for laying pipe and the like for use with a traction element having a draw bar thereof, as defined in claim 7; wherein (a) said rollers are concave and are complementary to the cross section of the pipe or the like passing therethrough, so as to support the pipe or the like passing thereover without crushing the sides thereof.

9. A device for laying pipe and the like for use with a traction element having a draw bar thereon, as defined in claim 6; wherein (a) an earth engaging member secured to said third frame portion at the rear end thereof and extending outwardly from the sides thereof and extending rearwardly therefrom and positioned intermediate the distal ends of said longitudinally extending openings through said third frame portion in a position to direct earth into the furrow formed by said plow to cover the lower-most pipe or the like and to form a bed on which the uppermost pipe or the like may be laid.

10. A device for laying pipe and the like for use with a traction element having a draw bar thereon, as defined in claim 9; wherein (a) said earth engaging member diverges outwardly to the rear and has a concave curve facing downwardly, (1) said earth engaging member being disposed at an acute angle with respect to the horizontal with the rear-most portion of said earth engaging member being lower than the forward end thereof.

References Cited by the Examiner
UNITED STATES PATENTS

| | | | |
|---|---|---|---|
| 628,039 | 7/99 | Rood et al. | 61—72.5 |
| 3,060,696 | 10/62 | Lang | 61—72.6 |

EARL J. WITMER, *Primary Examiner.*